(12) United States Patent
Cocchi et al.

(10) Patent No.: US 9,518,769 B2
(45) Date of Patent: Dec. 13, 2016

(54) MACHINE FOR PRODUCING AND DISPENSING LIQUID OR SEMILIQUID FOODSTUFFS

(75) Inventors: Andrea Cocchi, Calderara di Reno (IT); Roberto Lazzarini, Reggio Emilia (IT)

(73) Assignee: ALI S.P.A.-CARPIGIANI GROUP, Milan (IT)

( * ) Notice: Subject to any disclaimer, the term of this patent is extended or adjusted under 35 U.S.C. 154(b) by 562 days.

(21) Appl. No.: 13/101,248

(22) Filed: May 5, 2011

(65) Prior Publication Data

US 2011/0271690 A1    Nov. 10, 2011

(30) Foreign Application Priority Data

May 6, 2010    (IT) ................ MI2010A0811

(51) Int. Cl.
  *F25B 41/04*    (2006.01)
  *F25B 41/06*    (2006.01)

(52) U.S. Cl.
  CPC .......... *F25B 41/062* (2013.01); *F25B 2500/15* (2013.01); *F25B 2600/2513* (2013.01);
  (Continued)

(58) Field of Classification Search
  CPC ............... B05C 11/10; F25C 1/04; F25C 1/24; F25C 1/225; F25D 17/02; F25D 15/00; F25D 31/002; F25B 41/062; F25B 2500/15; F25B 2600/2513; F25B 2700/197; F25B 2700/21175
  (Continued)

(56) References Cited

U.S. PATENT DOCUMENTS 4,689,968 A    9/1987    McCulloch et al.
4,707,997 A *  11/1987   Bigler et al. .............. 62/341
(Continued)

FOREIGN PATENT DOCUMENTS

EP    1669705    6/2006
EP    1707903    10/2006
(Continued)

OTHER PUBLICATIONS http://web.archive.org/web/20090424000002/http://www.master-bilt.com/pdfs/io_manuals/blood_plasma_io.pdf   Master-Bilt Refrigeration Solutions Installation & Operations Manual.*
(Continued)

*Primary Examiner* — Len Tran
*Assistant Examiner* — Gordon Jones
(74) *Attorney, Agent, or Firm* — Shuttleworth & Ingersoll, PLC; Timothy Klima (57) ABSTRACT

A machine for producing and dispensing liquid or semiliquid foodstuffs, includes a heat-adjustment system including a thermal circuit within which a thermal fluid circulates. The thermal circuit includes a compressor, a condenser, an electronic expansion valve, an evaporator, and a control unit configured for determining a main parameter (SH) representative of instantaneous overheating of the thermal fluid coming out of the evaporator. A reference parameter (SHset) is determined as a function of a predetermined value (SHmin), and of an auxiliary value (DT) depending on a variation in time of the temperature (Tout) of the fluid coming out of the evaporator, and of the saturation temperature (Tsat) of the fluid coming out of the evaporator. An electric command signal (S) for the valve is generated as a function of a comparison between the main parameter (SH) and reference parameter (SHset).

17 Claims, 2 Drawing Sheets (52) U.S. Cl.
CPC ............... *F25B 2700/197* (2013.01); *F25B 2700/21175* (2013.01)

(58) Field of Classification Search
USPC ..... 62/135, 185, 201, 222, 224, 340; 222/54
See application file for complete search history.

(56) References Cited

U.S. PATENT DOCUMENTS

| | | | | |
|---|---|---|---|---|
| 5,187,944 | A | * | 2/1993 | Jarosch ........................ 62/225 |
| 5,392,612 | A | * | 2/1995 | Alsenz ................ F25B 41/062 62/115 |
| 5,782,103 | A | | 7/1998 | Schmidt |
| 5,813,242 | A | * | 9/1998 | Lawrence et al. ............ 62/156 |
| 5,966,950 | A | | 10/1999 | Schmidt et al. |
| 6,018,959 | A | | 2/2000 | Schmidt |
| 6,272,871 | B1 | * | 8/2001 | Eisenhour ............ B60H 1/3204 62/116 |
| 6,318,101 | B1 | * | 11/2001 | Pham et al. .................... 62/225 |
| 6,453,690 | B1 | * | 9/2002 | Kim ............................... 62/222 |
| 6,490,872 | B1 | * | 12/2002 | Beck et al. ...................... 62/66 |
| 6,578,373 | B1 | * | 6/2003 | Barbier ............... F25B 49/005 236/78 D |
| 6,711,911 | B1 | * | 3/2004 | Grabon et al. ................. 62/225 |
| 6,854,285 | B2 | * | 2/2005 | Jessen .................... F25B 49/02 236/92 B |
| 7,249,628 | B2 | * | 7/2007 | Pillion et al. ................. 165/289 |
| 7,762,094 | B2 | * | 7/2010 | Iwaki et al. .................... 62/225 |
| 2006/0162358 | A1 | * | 7/2006 | VanderZee ...................... 62/225 |
| 2010/0218519 | A1 | * | 9/2010 | Hall ...................... F25B 41/062 62/73 |
| 2013/0269376 | A1 | * | 10/2013 | Zugibe et al. ................. 62/115 |

FOREIGN PATENT DOCUMENTS

EP           1716760 A2 *  11/2006
JP           2006349282     12/2006

OTHER PUBLICATIONS

Control of an Electronic Expansion Valve Using an Adaptive PID Controller; Antonio Auguto Torres Maia,Marconi de Assis Silva,Ricardo Nicolau Nassar Koury,Luiz Machado,Alexandre Carlos Eduardo; accessed: http://docs.lib.purdue.edu/cgi/viewcontent.cgi?article=2108&context=iracc.*

Superheat Control: A Hybrid Approach; Matthew Elliott, Zachary Walton, Byron Bolding, Bryan P. Rasmussen, PhD, Received Dec. 8, 2008; accepted May 6, 2009, vol. 15, No. 6 HVAC&R Research Nov. 2009.*

Foreign Search Report dated Mar. 3, 2011 from counterpart application.

* cited by examiner

MACHINE FOR PRODUCING AND DISPENSING LIQUID OR SEMILIQUID FOODSTUFFS

This application claims priority to Italian Patent Application No. MI2010A000811 filed May 6, 2010, which application is incorporated by reference herein.

The present invention relates to a machine for producing and dispensing liquid or semiliquid products for use as food (or foodstuffs).

The present invention, without losing its general character, in particular relates to machines for producing and dispensing water-ices, sorbets, ice creams, soft ice-creams, shakes, cream, chocolate, yoghurts and the like and to machines for producing and preserving mixtures for ice-cream, chocolate, creams, sauces, soups and mixtures in general as well as similar products.

As known, these machines comprise a holding vat for a liquid base product, and a treatment circuit for the base product, so as to obtain said foodstuff. The latter can then be dispensed by means of suitable dispensers and/or preserved in a preservation tank.

The treatment circuit may comprise, depending on the type of machine taken into account, a heat treatment system for cooling or heating the product, a whipping cylinder for maintaining the product to a given viscosity degree, mixing means for mixing the base product with an auxiliary product, such as a sauce, etc.

The treatment circuit may comprise a heat-adjustment system for adjusting the temperature of the mixture being worked, the product to be supplied and/or possible intermediate products.

The heat-adjustment system comprises a compressor, a condenser, an electronic expansion valve, and an evaporator.

The expansion valve has the function of lowering the temperature of the liquid coming out of the condenser bringing it from the condensation temperature to the evaporation temperature through pressure lowering, thus enabling the refrigerant to feed the evaporator.

Operation of the expansion valve gives rise to the overheating phenomenon, which phenomenon must be suitably managed to enable correct heat adjustment of the foodstuff.

Overheating occurs when saturated dry vapours are heated in such a manner as to increase their temperature, at a constant pressure. Overheating is therefore defined by the difference between the absolute temperature of the vapours and the saturation temperature corresponding to the pressure for the fluid in question.

For this reason the thermostatic expansion valve must measure both pressure (and consequently the evaporation temperature) and temperature of the gases coming out of the evaporator and determine its opening degree as a function of the difference between these two values; this opening degree must grow on increasing of the difference. Operatively, opening of the valve can be adjusted by three different pressures: the bulb pressure measuring the refrigerant temperature on coming out of the evaporator, to which the evaporation pressure and the spring pressure supplying the blocking effect and enabling overheating adjustment are to be added, being in opposition.

Upon increasing of the refrigerant overheating at the evaporator's exit, the excess of the bulb pressure on the suction pressure tend to move the valve from its seat, enabling a greater refrigerant passage, so as to maintain the temperature difference between the saturation point of the evaporator and the temperature at the exit constant.

Generally, the relation between the valve opening and the overheating pressure is assumed as linear.

The overheating degree of the vapour coming out of the evaporator affects the operation stability and energy efficiency in an opposite manner. In fact, for instance, an overheating increase involves an increase in the valve stability and a reduction in the overall yield of the heat-adjustment system.

In the rearrangement of the equilibrium following introduction of disturbances (in terms of variation of the thermal load), under some operating conditions, the system can show an inability to recover a new stable equilibrium condition, characterised by the presence of cyclic oscillations (the so-called "huntings") between two inefficient-operation states clearly affecting the performance of the machine, and therefore the quality of the supplied foodstuff.

If the expansion valve is an electronic expansion valve, the mass flow is modulated through modification of the passage section of the valve by an electronic device. It is however necessary to define an appropriate control algorithm for adjusting the minimum stable overheating value depending on the thermal load.

In fact, it is to be borne in mind that in applications relating to food production and in particular ice-cream production, the operating conditions are very particular: the refrigerating cycle duration is very short and thermal loads are not constant in time. This means that the system must be able to provide very strict regulations to allow the cycle to take place following the required temperature/pressure profiles. Should not this be the case, the foodstuff would not be worked in an appropriate manner and the quality of same would be adversely affected.

Therefore in this context it is not possible either to apply the known heat-adjustment systems of the adaptive type (like that described in U.S. Pat. No. 5,966,950 or that described in U.S. Pat. No. 4,689,968 or yet that described in U.S. Pat. No. 5,782,103, or finally that described in U.S. Pat. No. 6,018,959, for example), or to apply equivalent systems like those described in EP1707903 that under these conditions would not be able to follow the system dynamics in a sufficiently quick manner. In fact it should be noted that known systems of the adaptive type for stabilizing their reference value require transients of a duration of minutes, i.e. a duration of the same order of magnitude as the overall duration of a whipping cycle.

Accordingly, it is an aim of the present invention to provide a machine for producing and dispensing liquid or semiliquid products for use as foodstuffs, in which the heat-adjustment system is able to adapt itself to the load variations in a sufficiently quick manner, in particular with reference to the whipping cycles.

Another aim of the invention is to make available a machine for producing and dispensing liquid or semiliquid foodstuffs, in which the heat-adjustment system is able to use its own evaporator in an efficient manner.

In accordance with the invention, the foregoing and further aims are achieved by a machine for producing and dispensing liquid or semiliquid foodstuffs comprising the technical features set out herein.

The technical features of the invention, according to the aforesaid aims, can be easily found in the present description, and the advantages will be more apparent from the following detailed description given with reference to the accompanying drawings representing an exemplary and non-limiting embodiment thereof.

In particular.

Figure 1:
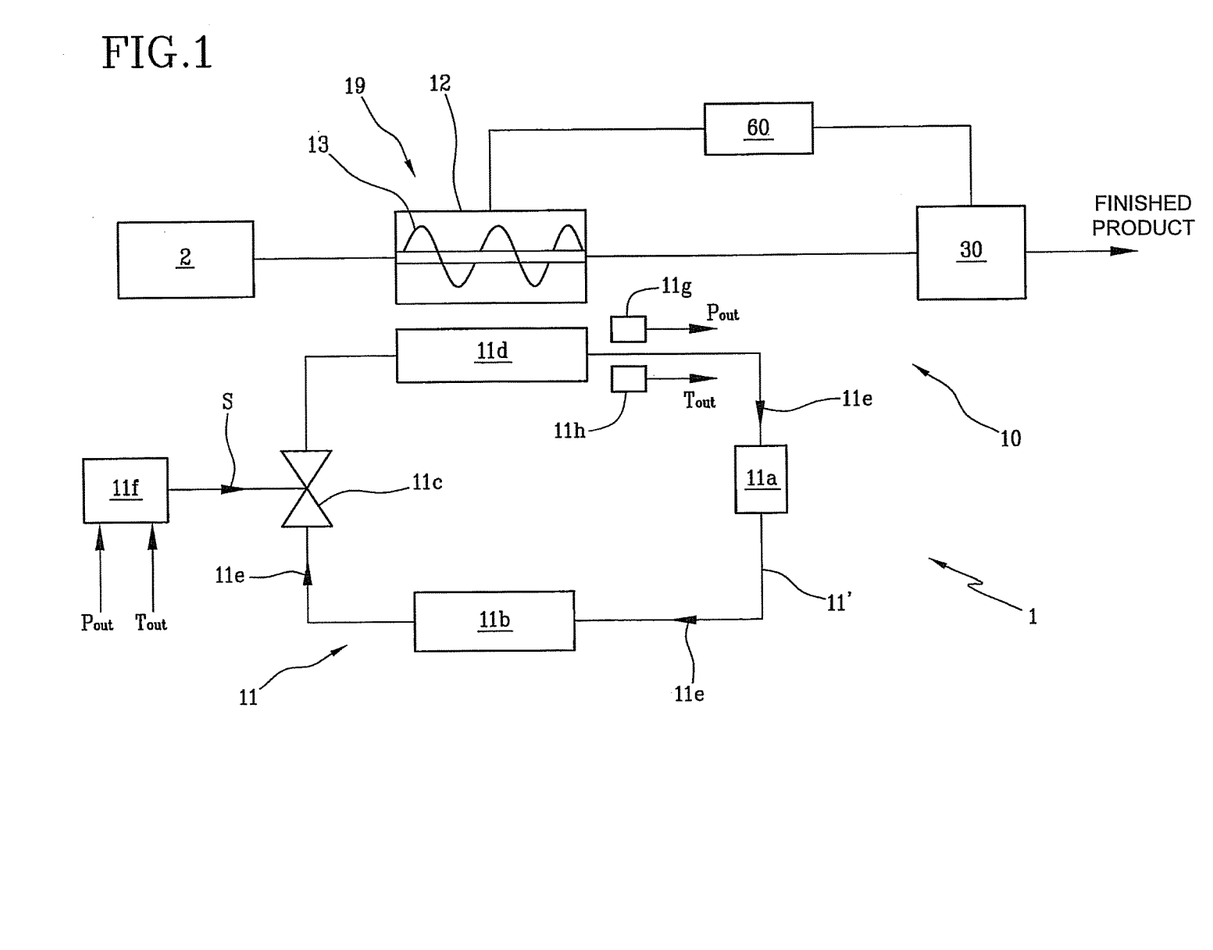
FIG. 1 shows a block diagram of the machine in accordance with the present invention.
Figure 2:
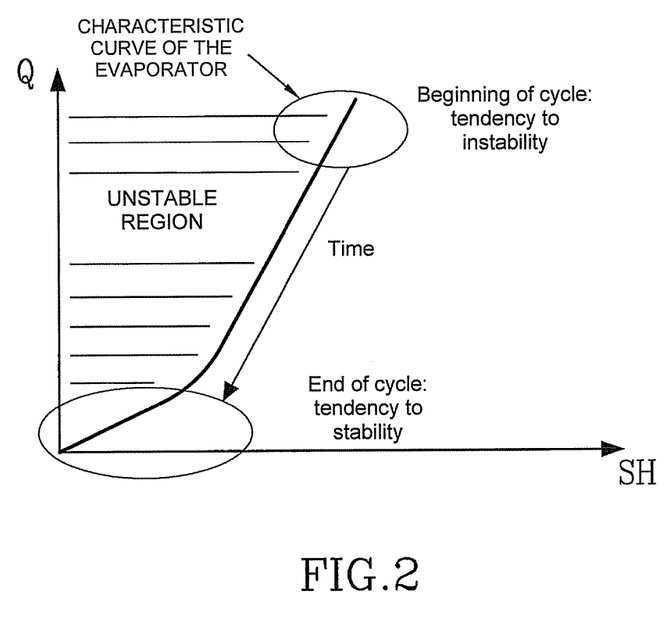
FIG. 2 is a schematic diagram of a curve characteristic of an evaporator used in the machine seen in FIG. 1.

In accordance with the accompanying drawings, a machine according to the present invention has been generally identified with reference numeral 1.

Referring to FIG. 1, the machine 1 first of all comprises a holding vat 2 for a liquid base product. The liquid base product, by way of example only, can be liquid cream, a mixture of substances for ice-creams, shakes, water-ices or a syrup; generally, the liquid base product can be any liquid product used for production of a liquid or semiliquid finished foodstuff. The finished foodstuff by way of example only, can be water-ice, sorbet, ice-cream, soft ice-cream, liquid cream, yoghurt, yoghurt-ice-cream, mixture for ice-cream, chocolate, cream, sauce, soup, any mixture in general and similar products. The finished product can also be an ice-cream shake or milk shake; the term "ice-cream shake" or "milk shake" is understood as indicating any frozen foodstuff or "semifreddo" (ice-cream cake) of neutral taste, also defined as neutral ice-cream, whisked with a dressing syrup of the desired taste and possibly with added soft portions of fruit pulp or solid portions in the form of seeds and the like.

Note that said holding vat 2, depending on requirements and the type of machine in which it is employed, in use can have a major extension in a horizontal or vertical direction; vat 2 can also consist of a box-shaped structure having at least one open side, or can consist of a substantially "closed" box-shaped structure.

For obtaining the final product starting from the base product, the machine 1 comprises a treatment circuit 10. The treatment circuit 10 in turn may comprise a heat-adjustment system 11 for cooling/heating the base product, the finished product and/or intermediate products; the heat-adjustment system 11 can also be such arranged as to keep the base product, finished product and/or intermediate products to a predetermined temperature.

The heat-adjustment system 11 will be described in greater detail in the following.

The treatment circuit 10 may comprise a dispensing device or an extruding whisking device, particularly if the finished product consists of whipped cream. The treatment circuit 10 may comprise a cooling and mixing unit 19 to mix the product and keep it to (or make it reach) a given temperature. For instance, the cooling and mixing unit 19 may comprise a whipping device 12, in particular should the final product consists of ice-cream.

Preferably, use of a stirrer 13 being part of said cooling and mixing unit 19 is provided; stirrer 13 is driven in rotation around its longitudinal axis so as to mix the product present in the whipping device according to a predetermined speed profile. Stirrer 13 can be mounted inside the whipping chamber of said whipping device 12, for example.

In a different embodiment (not shown), stirrer 13 can be mounted outside a cylindrical structure provided in a water-ice making device. In some embodiments stirrer 13 can be provided with a rotation shaft.

Specifically referring to production of ice-creams, the whipping device 12 has the task of maintaining the product in a creamy state even when the temperature of same is greatly reduced; more particularly, depending on the rotation speed of stirrer 13, it is possible to combine the product with different air amounts, thus obtaining finished products of different creamy consistency.

The treatment circuit 10 may comprise a mixing unit, particularly in case the final product consists of ice-cream shake or milk shake.

The machine 1 further comprises dispensing means 30 suitably provided for enabling distribution of the finished product and preferably connected downstream of the treatment circuit 10, and in particular downstream of the whipping device 12.

The dispensing means 30 may for example consist of nozzles or taps; the dispensing means 30 can be manually adjusted, or adjusted by suitable electronic control means cooperating with a sensor adapted to detect the dispensed amount of finished product, so as to determine the instant at which the dispensing means has to be automatically shut off.

Preferably, the machine 1 further comprises an electronic management unit 60 at least acting on a plurality of actuators for regulating and managing operation of same and consequently operation of machine 1.

Practically, the management unit 60 can be an electronic control card of known type, suitably designed for operation of machine 1 according to a preset program and therefore for obtaining the finished product starting from one or more base products.

As mentioned above, the treatment circuit 10 comprises a heat-adjustment system 11. The heat-adjustment system 11 includes a thermal circuit 11' provided with a compressor 11a, a condenser 11b, an electronic expansion valve 11c and an evaporator 11d. A thermal fluid 11e circulates in the thermal circuit 11'.

The task of compressor 11a is to maintain the correct pressure in the thermal circuit 11' so as to enable circulation of the thermal fluid.

The condenser or gas cooler 11b has the function of drawing heat from the thermal fluid, which heat is used for enabling the fluid to condense.

The electronic expansion valve 11c is interposed between condenser 11b and evaporator 11d. The expansion valve 11c is designed to lower the temperature of the fluid coming out of condenser 11b, bringing such a temperature from the condensing value to the evaporating value, through pressure lowering, so that the fluid can feed the evaporator 11d.

The evaporator or heat-exchanger 11d is used for "producing the cold" and therefore cooling the base product, the finished product and/or intermediate products. This depends on which part of the machine 1 is thermally associated with evaporator 11d, i.e. which part of the machine 1 is brought to a condition of carrying out a heat exchange with evaporator 11d.

Advantageously, evaporator 11d can be thermally associated with the whipping device 12, so that the foodstuff is maintained to a temperature low enough during the whipping step. By way of example, the evaporator 11d can be disposed close to or can face the whipping device 12.

Preferably, the heat-adjustment system 11 is a refrigerating system, and the thermal fluid 11e is a refrigerant. By way of example, the fluid can be of the R-404A type.

Preferably, along the closed thermal circuit 11', the different elements are disposed in the following order (diagrammatically shown in FIG. 1): compressor 11a, condenser 11b, expansion valve 11c, evaporator 11d. The thermal fluid 11e flows following the direction indicated by arrows in FIG. 1.

The heat-adjustment system 11 further comprises a control unit 11f, acting on the expansion valve 11c. The control unit 11f is configured for sending electric command signals S to the expansion valve 11c, so as to regulate the passage section of the valve itself.

Preferably, the electronic expansion valve 11c is provided with an electromechanical actuator, such as a stepping motor that, suitably powered, causes gradual movement of a closure member, thus defining the passage section of the valve itself. Therefore the command signals S will be conveniently addressed to said electromechanical actuator.

Advantageously, the control unit 11f applies an algorithm of the predictive type capable of constantly tracking the load and at the same time making the overheating value stable.

In greater detail, in the preferred embodiment the control unit 11f starts the system, initialises the variables and determines the machine state. By way of example, the machine state (previously set by an operator) can be of the "EXCELLENT" or of the "SPEED" type. Depending on the state in which the machine is, the control unit 11f carries out an appropriate setting of the parameters to be used. Further details concerning the two different machine states will be provided in the following.

The control unit 11f then determines a main parameter SH representative of the instantaneous overheating of the thermal fluid 11e coming out of evaporator 11d.

Preferably, the main parameter SH is determined as a function of a difference between the temperature Tout of the fluid 11e coming out of evaporator 11d and the saturation temperature Tsat of the fluid 11e coming out of said evaporator 11d.

In other words, the following relation can be used:

$$SH = Tout - Tsat.$$

The saturation temperature Tsat can be advantageously determined as a function of the pressure Pout of the fluid coming out of evaporator 11d.

By way of example, with reference to the refrigerating fluid R-404A, the relation between Pout and Tsat can be defined by a prestored table, in which each Pout value is associated with a corresponding Tsat value. This table is conveniently obtained from the saturation curve of the refrigerating fluid used.

The following table 1 practically shows a correspondence between Pout values and Tsat values.

TABLE 1

| T -C. | P Bar |
|---|---|
| −45 | 1.055 |
| −44.5 | 1.08 |
| −44 | 1.106 |
| −43.5 | 1.132 |
| −43 | 1.159 |
| −42.5 | 1.186 |
| −42 | 1.214 |
| −41.5 | 1.242 |
| −41 | 1.271 |
| −40.5 | 1.3 |
| −40 | 1.33 |
| −39.5 | 1.36 |
| −39 | 1.391 |
| −38.5 | 1.422 |
| −38 | 1.454 |
| −37.5 | 1.487 |
| −37 | 1.52 |
| −36.5 | 1.553 |
| −36 | 1.587 |
| −35.5 | 1.622 |
| −35 | 1.658 |
| −34.5 | 1.693 |
| −34 | 1.73 |
| −33.5 | 1.767 |
| −33 | 1.805 |
| −32.5 | 1.843 |

TABLE 1-continued

| T -C. | P Bar |
|---|---|
| −32 | 1.882 |
| −31.5 | 1.922 |
| −31 | 1.962 |
| −30.5 | 2.003 |
| −30 | 2.045 |
| −29.5 | 2.087 |
| −29 | 2.13 |
| −28.5 | 2.174 |
| −28 | 2.218 |
| −27.5 | 2.263 |
| −27 | 2.309 |
| −26.5 | 2.355 |
| −26 | 2.402 |
| −25.5 | 2.45 |
| −25 | 2.499 |
| −24.5 | 2.548 |
| −24 | 2.598 |
| −23.5 | 2.649 |
| −23 | 2.701 |
| −22.5 | 2.753 |
| −22 | 2.806 |
| −21.5 | 2.86 |
| −21 | 2.915 |
| −20.5 | 2.97 |
| −20 | 3.027 |
| −19.5 | 3.084 |
| −19 | 3.142 |
| −18.5 | 3.2 |
| −18 | 3.26 |
| −17.5 | 3.32 |
| −17 | 3.382 |
| −16.5 | 3.444 |
| −16 | 3.507 |
| −15.5 | 3.571 |
| −15 | 3.635 |
| −14.5 | 3.701 |
| −14 | 3.767 |
| −13.5 | 3.835 |
| −13 | 3.903 |
| −12.5 | 3.973 |
| −12 | 4.043 |
| −11.5 | 4.114 |
| −11 | 4.186 |
| −10.5 | 4.259 |
| −10 | 4.333 |
| −9.5 | 4.408 |
| −9 | 4.484 |
| −8.5 | 4.561 |
| −8 | 4.639 |
| −7.5 | 4.718 |
| −7 | 4.798 |
| −6.5 | 4.879 |
| −6 | 4.961 |
| −5.5 | 5.044 |
| −5 | 5.128 |
| −4.5 | 5.213 |
| −4 | 5.299 |
| −3.5 | 5.386 |
| −3 | 5.475 |
| −2.5 | 5.564 |
| −2 | 5.655 |
| −1.5 | 5.746 |
| −1 | 5.839 |
| −0.5 | 5.933 |
| 0 | 6.028 |
| 0.5 | 6.124 |
| 1 | 6.222 |
| 1.5 | 6.32 |
| 2 | 6.42 |
| 2.5 | 6.52 |
| 3 | 6.622 |
| 3.5 | 6.726 |
| 4 | 6.83 |
| 4.5 | 6.936 |
| 5 | 7.043 |
| 5.5 | 7.151 |
| 6 | 7.26 |

TABLE 1-continued

| T −C. | P Bar |
|---|---|
| 6.5 | 7.371 |
| 7 | 7.482 |
| 7.5 | 7.595 |
| 8 | 7.71 |
| 8.5 | 7.826 |
| 9 | 7.943 |
| 9.5 | 8.061 |
| 10 | 8.18 |
| 10.5 | 8.301 |
| 11 | 8.424 |
| 11.5 | 8.547 |
| 12 | 8.672 |
| 12.5 | 8.798 |
| 13 | 8.926 |
| 13.5 | 9.055 |
| 14 | 9.186 |
| 14.5 | 9.318 |
| 15 | 9.451 |
| 15.5 | 9.586 |
| 16 | 9.722 |
| 16.5 | 9.859 |
| 17 | 9.999 |
| 17.5 | 10.139 |
| 18 | 10.281 |
| 18.5 | 10.425 |
| 19 | 10.57 |
| 19.5 | 10.716 |
| 20 | 10.864 |
| 20.5 | 11.014 |
| 21 | 11.165 |
| 21.5 | 11.317 |
| 22 | 11.472 |
| 22.5 | 11.627 |
| 23 | 11.785 |
| 23.5 | 11.944 |
| 24 | 12.104 |
| 24.5 | 12.266 |
| 25 | 12.43 |
| 25.5 | 12.596 |
| 26 | 12.763 |
| 26.5 | 12.932 |
| 27 | 13.102 |
| 27.5 | 13.274 |
| 28 | 13.448 |
| 28.5 | 13.623 |
| 29 | 13.801 |
| 29.5 | 13.979 |
| 30 | 14.16 |

In the preferred embodiment the heat-adjustment system 11 can be provided with a first sensor 11g adapted to detect a parameter representative of the pressure Pout of fluid 11e coming out of evaporator 11d. This detection carried out by the first sensor 11g can therefore be used by the control unit 11f for calculating the saturation temperature Tsat.

Preferably, the heat-adjustment system 11 further comprises a second sensor 11h adapted to detect a parameter of the temperature Tout of fluid 11e coming out of evaporator 11d. This detection can therefore be used by the control unit 11f for calculating the main parameter SH as above stated.

The control unit 11f further carries out determination of a reference parameter SHset, acting as a reference or "target" for overheating. In other words, the SHset value is the value that the instantaneous overheating should take to enable the (starting, intermediate or final) foodstuff to reach or keep the desired temperature. In greater detail, the reference parameter SHset is determined as a function of a predetermined value SHmin, and an auxiliary value DT.

Preferably the predetermined value SHmin is a constant value fixed at the starting setting step of the heat-adjustment system 11.

By way of example, SHmin can take a value included between 0 and 10. As for the other parameters to be examined in the following, this value can vary depending on the features and sizes of the machine's refrigerating plant.

Preferably, the auxiliary value DT depends on the variation in time of the temperature Tout of the fluid 11e coming out of evaporator 11d and the saturation temperature Tsat of the fluid 11e coming out of said evaporator 11d. This means that the auxiliary value DT is calculated, at a given time instant, not only as a function of the value taken by Tout and Tsat at that instant, but also as a function of the behaviour that Tout and Tsat have had at previous time instants.

In other words, the auxiliary value DT is determined as a function of a derivative relative to the time of a parameter depending on the temperature Tout of the fluid 11e coming out of evaporator 11d and the saturation temperature Tsat.

More particularly, the auxiliary value DT is determined as a function of a variation in time of an average between the temperature Tout of the fluid 11e coming out of evaporator 11d and the saturation temperature Tsat.

In greater detail, the auxiliary value DT is determined as a function of a derivative relative to the time of an average between the temperature Tout and the saturation temperature Tsat.

By way of example, for determining the auxiliary value DT it is possible to do as follows.

First an average is calculated on four samples, for instance at 1 ms intervals, of the temperature values Tout and Tsat (determined as above described). Then the mean temperature value is updated with a new value calculated:

$$\overline{T} = \frac{\overline{Tsat} + \overline{Tout}}{\overline{T(i+1)} \leftarrow 2\overline{T(i)}}$$

In the preferred embodiment, the last value of the average temperature is discarded. Therefore the control unit 11f carries out calculation of a moving average on 64 samples of the arithmetic mean as defined:

$$T_{63} = T_{62}$$

$$T_{62} = T_{61}$$

$$\vdots$$

$$T_{01} = T_{00}$$

$$T_{00} = T$$

$$T^{MovAvg} = \frac{\overline{T_0} + \overline{T_1} + \overline{T_2} + \ldots + \overline{T_{63}}}{64}$$

Then calculation of the derivative relative to the time of the value calculated in the preceding passage is carried out:

$$dT^{MovAvg} = T_0^{MovAvg} - T_1^{MovAvg} =$$
$$= \frac{\overline{T_0} + \overline{T_1} + \overline{T_2} + \ldots + \overline{T_{63}}}{64} - \frac{\overline{T_1} + \overline{T_2} + \overline{T_3} + \ldots + \overline{T_{64}}}{64}$$
$$= \frac{\overline{T_0} - \overline{T_{64}}}{64}$$

At this point the auxiliary value DT can be calculated:

$$DT = dT^{MovAvg} \cdot Dg$$

Note that Dg is a gain term set during the programming step. By way of example the gain term Dg can take values in the order of 10.

Advantageously, the control unit 11$f$ can perform a control operation on the obtained auxiliary value DT, checking inclusion of the same between a predetermined maximum value and a predetermined minimum value defining an acceptability range.

Once the auxiliary value DT has been determined, the control unit 11$f$ can carry out calculation of the reference parameter SHset. The latter can be calculated as a function of the sum between the predetermined SHmin value and the auxiliary value DT.

By way of example, therefore the following relation can be adopted:

$$SHset = SHmin - DT$$

In this way the reference parameter SHset (that can be also indicated as "overheating set") is adjusted to the load and an attempt is made to minimise the difference between the measured/calculated values and the preset values.

Once the above mentioned main parameter SH and reference parameter SHset have been determined, the control unit 11$f$ carries out a comparison between them and, based on this comparison, generates said electric command signals S.

In greater detail, the control unit 11$f$ calculates the error obtained as the difference between the main parameter SH and reference parameter SHset:

$$E = SH - SHset$$

Then updating of the array of errors is carried out:

$$E(i) \leftarrow E(i+1)$$

Depending on the hitherto calculated magnitudes, the control unit 11$f$ determines the parameters necessary for carrying out a control of the PID (Proportional-Integral-Derivative) type.

In particular, the term proportional P is determined as the product of the error by the proportional gain:

$$P = E \cdot Pgain$$

The proportional gain Pgain can for instance take a value included between $1/20$ and $1/100$. Preferably, a control technique of the $P^2$ID type is adopted.

The control unit 11$f$ then calculates the proportional square term $P^2$ as the production of the proportional term P and its absolute value |P|, so as to obtain a value equal to the square of value P and also having the sign of the same term P:

$$P^2 = P \cdot |P|$$

Note that use of the square term $P^2$ is advantageous for carrying out the load variations in an accurate and reliable manner.

In addition, use of the term $P^2$ reduces the influence of the proportional term under given error values, avoiding the valve to be uselessly moved when in the vicinity of the overheating set.

Vice versa, above certain error values, use of the term $P^2$ enables a greater adjustment speed relative to the normal term P, so that the relative slowness in reading the outgoing temperature Tout can be compensated for, so that it is possible to face danger situations more readily, such as the gas tendency to reach the compressor in a liquid state.

Then determination of the integral term is carried out. To this aim, the control unit 11$f$ initially generates and then updates a variable defined as "error accumulator". The increase is defined by the error calculated in the current cycle:

$$Eacc(i) = Eacc(i-1) + E$$

Calculation of the integral term can therefore be performed as the product of the error accumulator by the integral gain:

$$I = Eacc \cdot Igain$$

The integral gain Igain can for instance take a value included between $1/50$ and $1/500$.

The control unit 11$f$ preferably also carries out calculation of the derivative term. To this aim, the moving average is calculated on 16 samples of the error:

$$E_{15} = E_{14}$$
$$E_{14} = E_{13}$$
$$\vdots$$
$$E_{01} = E_{00}$$
$$E_{00} = E$$
$$E^{MovAvg} = \frac{E_0 + E_1 + E_2 + \ldots + E_{15}}{16}$$

Calculation of this type of average is advantageous in terms of filtering of the disturbances.

The control unit 11$f$ can then calculate the derivative term D as the product of the moving average of the error calculated as above stated by the derivative gain:

$$D = E^{MovAvg} \cdot Dgain$$

The derivative gain Dgain can for instance take a value included between 0 and 5.

Advantageously, the control unit 11$f$ can perform a control step on the value of the calculated terms P, I and D, so as to check whether they fall within predetermined ranges. Should one term fall out of the bounds of the preset range, the value of this term can be imposed equal to the minimum or maximum acceptable values.

Depending on the proportional, integral and derivative terms, calculated as above stated as a function of the error (i.e. depending on the difference between true overheating and "target" overheating), the control unit 11$f$ conveniently generates the command signals S for the electronic expansion valve 11$c$ for regulation of the passage section of same.

Preferably, each electrical command signal S is representative of a POS parameter indicative of the number of steps that the stepping motor included in the electronic valve 11$c$ must accomplish for regulating the passage section.

In particular, the POS parameter can be determined as the sum of said proportional, integral and derivative terms:

$$POS = P^2 + I + D$$

Preferably, before signal S incorporating the POS parameter is sent to the electronic valve 11$c$, the control unit 11$f$ performs a control step on the calculated value of the POS parameter in order to check whether such a value falls within the limits of a predetermined range. If that is so, signal S is sent to the electronic valve 11$c$; if it is not so, the value of the POS parameter can be "constrained" to be equal to acceptable prestored maximum and minimum values.

Once the electronic expansion valve 11$c$ receives the command signal S, the stepping motor is moved depending on the value of the POS parameter incorporated by signal S, so as to define a new passage section for the fluid 11e from condenser 11b to evaporator 11d.

By way of example, the command signal S can consist of a series of pulses supplied to one or more steps of the motor for rotating the latter. The duration of a pulse for rotating the motor by one step can be equal to TP=32 ms+/−10%, for example.

Preferably, every 500 ms Tout and Pout are sampled and, depending on the processing operations performed by the control unit 11f, the motor position may be updated through calculation of a new POS parameter and generation of a respective electric command signal S. Preferably, for actuation of the valve motor 11c four outputs of the control unit 11f are used. These outputs can be of the NPN open-collector type, provided with recirculation diodes, one for each motor step (for instance, integrated circuits commercially identified as ULN2003 and ULN2803 can be used). The "common" terminal of the motor is advantageously connected to the positive terminal of the power. Preferably, the motor of valve 11c is a motor provided for receiving a 12 V power. For powering such a motor 500 mA direct current can be conveniently used, in case two phases are simultaneously and constantly fed.

Taking into account the above description, it is possible to see that the starting magnitudes for carrying out the control technique according to the invention (i.e. Tout and Pout) are detected at the evaporator's exit 11d, i.e. downstream of the heat exchange between evaporator 11d and whipping device 12. This means that the herein described control algorithm can be advantageously used for adjustment of the heat conditions of the foodstuff during the whipping step.

In the preferred embodiment, the control unit 11f can perform control operations also on the values obtained for parameters DT, P, I and/or D for checking whether the same belong to respective acceptability ranges.

If one of these parameters would not belong to the provided range, the value of this parameter could be imposed as equal to the maximum or minimum value of the range.

Note that the control unit 11f of the heat adjustment system 11 has been described as a single device capable of performing a series of calculations and operating steps. By way of example, the control unit 11f will be able to be made as a suitably programmed processor associated with the machine 1. Clearly, this control unit 11f can also be obtained through different electronic devices suitably associated with each other and suitably connected to the machine 1.

It should be also noted that the control unit 11f can also be comprised in the above mentioned management unit 60. The latter, in fact, not only generally manages operation of the machine 1, but can also be provided for control of the heat-adjustment system 11 as above described.

In the light of the above, the advantages offered by the proposed solution can be clearly identified. In fact, the whipping cycle of a machine for producing liquid or semi-liquid foodstuffs, and in particular for producing ice-cream, has a duration of about ten minutes. During this period of time quick transients occur that can result in important temperature variations (i.e. of different degrees K) and therefore it is of the fundamental importance for the control algorithm to be able to manage them.

As regards efficiency, it is necessary to use the whole surface of evaporator 11d at best, without returns of fluid in the liquid state to compressor 11a. These requirements can be met by an overheating following the course of the load of evaporator 11d.

In the systems of known type, the overheating set, i.e. the reference value or "target" used for determining the error, is usually predetermined. For instance, in case of a thermostatic valve, the overheating set can be only adjusted by setting a calibration spring. In the present invention, on the contrary, the overheating set (i.e. the reference parameter SHset) dynamically changes as the temperature varies according to the above described algorithm. In particular, value SHset is also determined as a function of a term (the auxiliary value DT) depending on the variation in time of Tout and Tsat.

The advantages of this type of solution can be evaluated by considering the characteristic curve of the evaporator used, representing the ideal overheating course for a given heat exchange Q (i.e. for a given thermal load). This curve is diagrammatically shown in FIG. 2.

Through the auxiliary value DT the temperature variation in time is taken into account and then the different heat exchange of the evaporator. Consequently the control adjusts the reference parameter SHset to the heat-exchange conditions. In other words, the overheating set is increased when the temperatures vary quickly (i.e. when the slope of the characteristic curve is greater and therefore there is a greater heat exchange). On the contrary, when the temperatures vary more slowly, the overheating set is reduced.

Therefore, the adjustment system according to the present invention allows the control to be adjusted to the thermal-load conditions during the "frost": when temperatures go down more quickly (beginning of frost) the heat exchange is greater and a greater overheating set is maintained; when temperatures go down more slowly (end of frost), the heat exchange is smaller and a lower overheating set is maintained.

In addition, another advantage results in that it is possible to adapt the adjustment to the different types and amounts of mixtures introduced into the whipping cylinder: in case of minimum mixture amounts, temperatures go down quickly and the gain of the simple integral term (used in systems of known type) could be insufficient for ensuring an appropriate speed in the valve closure; the overheating set is then increased so as to raise the value of errors (calculated as the difference between measured overheating and overheating set) and compensate for the relative slowness of the integral.

APPLICATION EXAMPLE

Introduction

When the machine is first started, the control unit 11f carries out full closure of the electronic valve 11c (520 steps) irrespective of the starting position and therefore defines the zero point. The time required for the operation is of 16.5 s. After this initialization step, the control unit 11f waits for the beginning of a whipping cycle and keeps valve 11c in the closed position so as to also carry out the function of solenoid valve. The control unit 11f operates on the valve (opening it and adjusting the opening degree thereof) only when compressor 11a is active. In all the other functions of the machine, the control unit 11f brings valve 11c back to the zero point established at the first turning on.

"SPEED" Whipping Cycle

On starting of the compressor, the control unit 11f, due to the first sensor 11g and the second sensor 11h, samples, at each second, the temperature values (Tout) and pressure values (Pout) of the fluid 11e coming out of the evaporator. From the measured pressure value Pout it is obtained the corresponding saturation temperature value Tsat (value obtained from the saturation curve of the refrigerating fluid) and the overheating SH is calculated as the difference between the temperature on coming out of the evaporator Tout and the saturation temperature Tsat (SH=Tout−Tsat). The obtained value is compared with an overheating set value (SHset) calculated as a function of the derivative in time of the mean temperature values out (Tout) of evaporator 11d and the saturation values Tsat. Practically, at each sampling instant of these temperatures, the minimum overheating set is increased by a factor proportional to the derivative of the moving average (calculated on a time interval of 64 preceding samples equal to 64 s) of the arithmetic mean of Tsat and Tout.

The overheating value that is obtained each second is the one that the control tries to reach by acting on the opening degree of the valve during the whole whipping cycle, irrespective of the features of the product contained in the cylinder (temperature, amount and consistency). Depending on the deviation between measured overheating (SH) and calculated overheating (SHset), the three control terms ($P^2$, I and D) are defined, the sum of which gives back the opening position (expressed in number of steps) that valve 11c must reach.

"EXCELLENT" Whipping Cycle

On turning on of the compressor the control unit 11f limits opening of valve 11c to a predetermined maximum value. By means of the first and second sensors 11g, 11h then it goes on sampling the temperature and pressure values Tout, Pout, and goes on calculating the values of terms $P^2$, I and D. Depending on the last values, the opening degree of the electronic valve 11c is determined (expressed through the POS parameter and sent to the electronic valve 11c through the command signal S).

The maximum value initially established is ignored only if overheating SH goes below a predetermined value, and the adjustment technique applied by the control unit 11f becomes the same as described for the "SPEED" cycle.

The invention claimed is:

1. A machine for producing and dispensing a liquid or semiliquid product for use as a foodstuff, comprising:
   a holding vat for a liquid base product;
   a treatment circuit for said liquid base product, in order to obtain a liquid or semiliquid foodstuff, said treatment circuit comprising at least one heat-adjustment system for adjusting at least one value associated with a temperature of at least one chosen from said base product, an intermediate product and a finished product;
   a dispensing mechanism for distributing said foodstuff;
   wherein said heat-adjustment system comprises:
      a thermal circuit within which a thermal fluid circulates, and including a compressor, a condenser, an electronic expansion valve, and an evaporator, an outlet of the compressor being fluidly connected to an inlet of the condenser, an outlet of the condenser being fluidly connected to an inlet of the evaporator, an outlet of the evaporator being fluidly connected to an inlet of the compressor and said electronic expansion valve being interposed between said condenser and evaporator;
      a control unit acting on said electronic expansion valve for adjusting a passage section of the electronic expansion valve through an electronic command signal (S), said control unit being configured for:
         determining a main parameter (SH) representative of an actual instantaneous overheating of the thermal fluid coming out of the evaporator, wherein said main parameter (SH)=(Tout)−(Tsat), where:
         (Tout) is a temperature of the fluid coming out of the evaporator, the temperature of the fluid taken between the outlet of the evaporator and the inlet of the compressor;
         (Tsat) is a saturation temperature of the fluid coming out of the evaporator; wherein (Tsat) is determined as a function of a pressure (Pout) of the fluid coming out of said evaporator, the pressure (Pout) of the fluid also taken between the outlet of the evaporator and the inlet of the compressor;
         determining a target reference parameter (SHset) for said overheating, a value thereof being a value that the instantaneous overheating should take to enable the foodstuff to at least one chosen from, reach a desired temperature and keep a desired temperature, said target reference parameter (SHset) being determined as a function of a predetermined value (SHmin), and of an auxiliary value (DT) calculated depending on a variation in time of the temperature (Tout) of the fluid coming out of the evaporator and of the saturation temperature (Tsat) of the fluid coming out of the evaporator such that the auxiliary value (DT) is calculated based on both 1) instantaneous values of (Tout) and (Tsat) taken at a current time and 2) values of (Tout) and (Tsat) taken at previous times;
         generating said electric command signal (S) as a function of a comparison between said main parameter (SH) and target reference parameter (SHset).

2. The machine of claim 1, wherein said treatment circuit comprises a cooling and mixing unit equipped with a whipping device, said evaporator being thermally associated with said whipping device for adjusting the temperature of the foodstuff present in said whipping device.

3. The machine of claim 1, wherein said heat-adjustment system further comprises a first sensor adapted to detect a parameter representative of the pressure (Pout) of the fluid coming out of said evaporator.

4. The machine of claim 1, wherein said heat-adjustment system further comprises a second sensor adapted to detect a parameter representative of the temperature (Tout) of the fluid coming out of said evaporator.

5. The machine of claim 1, wherein said auxiliary value (DT) is determined as a function of a variation in time of an average between the temperature (Tout) of the fluid coming out of the evaporator and the saturation temperature (Tsat) of the fluid coming out of the evaporator.

6. The machine of claim 1, wherein said auxiliary value (DT) is determined as a function of a derivative in respect of time of a parameter depending on the temperature (Tout) of the fluid coming out of the evaporator and on the saturation temperature (Tsat) of the fluid coming out of the evaporator.

7. The machine of claim 5, wherein said auxiliary value (DT) is determined as a function of a derivative in respect of time of an average between the temperature (Tout) of the fluid coming out of the evaporator and the saturation temperature (Tsat) of the fluid coming out of the evaporator.

8. The machine of claim 1, wherein said predetermined value (SHmin) is a constant value fixed during the starting setting of the heat-adjustment system.

9. The machine of claim 1, wherein said target reference parameter (SHset) is determined as a function of a sum between said predetermined value (SHmin) and auxiliary value (DT).

10. The machine of claim 1, wherein said control unit is configured for applying a PID control technique to an error defined by a difference between said main parameter (SH) and target reference parameter (SHset), for generating the electric command signal (S).

11. The machine of claim 10, wherein the PID control technique calculates the proportional term P as a product of the proportional term P and of an absolute value thereof |P| to obtain a value equal to a square of the value of term P and also having a sign of the term P.

12. The machine of claim 4, wherein said second sensor comprises at least one chosen from a resistive temperature sensor, and a thermocouple.

13. The machine of claim 1, wherein said electronic valve comprises an adjustable closure member and an electromechanical actuator for adjusting said closure member, said command signal (S) for controlling said electromechanical actuator.

14. The machine of claim 1, wherein said auxiliary value (DT) is determined as a function of a variation in time of a mean of a plurality of temperatures (Tout) of the fluid coming out of the evaporator and saturation temperatures (Tsat) of the fluid coming out of the evaporator taken at a sampling frequency, and at each sampling instant of these temperatures, increasing the target reference parameter (SHset) by a factor proportional to a derivative of a moving average of the mean of (Tsat) and (Tout).

15. The machine of claim 1, wherein the control unit generates said electric command signal (S) for limiting opening of the passage section of the electronic expansion valve to a predetermined maximum value and overrides the predetermined maximum value only if the main parameter (SH) falls below a predetermined value.

16. The machine of claim 1, wherein the saturation temperature (Tsat) is determined as the function of the pressure (Pout) via a prestored correspondence table in which each pressure (Pout) value is associated with a corresponding saturation temperature (Tsat) table.

17. The machine of claim 16, wherein the prestored correspondence table is derived from a saturation curve of the thermal fluid used in the thermal circuit.

* * * * *